(12) United States Patent
Benhadda

(10) Patent No.: US 8,458,182 B2
(45) Date of Patent: Jun. 4, 2013

(54) METHOD AND SYSTEM FOR CLUSTERING DATA ARISING FROM A DATABASE

(75) Inventor: Hamid Benhadda, Rueil-Malmaison (FR)

(73) Assignee: Thales, Neuilly-sur-Siene (FR)

( * ) Notice: Subject to any disclaimer, the term of this patent is extended or adjusted under 35 U.S.C. 154(b) by 0 days.

(21) Appl. No.: 13/142,734

(22) PCT Filed: Dec. 21, 2009

(86) PCT No.: PCT/EP2009/067702
§ 371 (c)(1),
(2), (4) Date: Sep. 6, 2011

(87) PCT Pub. No.: WO2010/076260
PCT Pub. Date: Jul. 8, 2010

(65) Prior Publication Data
US 2012/0109959 A1      May 3, 2012

(30) Foreign Application Priority Data
Dec. 30, 2008   (FR) ...................................... 08 07490

(51) Int. Cl.
G06F 7/00 (2006.01)
(52) U.S. Cl.
USPC .......................... 707/737; 707/739; 707/741
(58) Field of Classification Search
USPC ......................................... 707/737, 739, 741
See application file for complete search history.

(56) References Cited

U.S. PATENT DOCUMENTS

| 6,976,207 | B1 * | 12/2005 | Rujan et al. | 715/234 |
| 8,285,719 | B1 * | 10/2012 | Long et al. | 707/737 |
| 2009/0287723 | A1 | 11/2009 | Ah-Pine et al. | |

FOREIGN PATENT DOCUMENTS

| EP | 1960916 A1 | 8/2008 |
| WO | 2007/068741 A1 | 6/2007 |

OTHER PUBLICATIONS

Mustapha Lebbah et al.: "Relational Analysis for Consensus Clustering from Multiple Partitions," Machine Learning and Applications, 20083. Conference on, IEEE, Piscataway, NJ, USA, Dec. 11, 2008, pp. 218-223.

Benhadda H et al.: "Introduction a la similarite regularisee en analyse relationelle," Internet Citation, [Online] Rev. Statistique Appliquee, 1998.

* cited by examiner

*Primary Examiner* — Belix M Ortiz Ditren
*Assistant Examiner* — Mellissa M Chojnacki
(74) *Attorney, Agent, or Firm* — Baker & Hostetler LLP

(57) ABSTRACT

A method for clustering data or objects in an array, each element of the array corresponding to a similarity between the objects implemented within a computer linked with a database containing the data or objects The method includes determining a number of classes of objects based on values of the relationships computed between an object and a previously established class, for each class found, determining the value of each of the relationships between a class and the other classes, and merging certain classes, and taking each object of each class one by one, determining the value of the relationship of each object with each of the classes other than the class into which the object was initially classed, if the value of the relationship is greater then transferring the object to the new class, this is continued until all the values of the relationships are negative.

6 Claims, 2 Drawing Sheets

US 8,458,182 B2

METHOD AND SYSTEM FOR CLUSTERING DATA ARISING FROM A DATABASE

CROSS-REFERENCE TO RELATED APPLICATIONS

This application is a National Stage of International patent application PCT/EP2009/067702, filed on Dec. 21, 2009, which claims priority to foreign French patent application No. FR 08 07490, filed on Dec. 30, 2008, the disclosures of which are incorporated by reference in their entirety.

FIELD OF THE INVENTION

The subject of the present invention relates notably to a method and a system making it possible to cluster data taking the form of relational matrices, that is to say that there exist relations between the objects $O_i$ or data of this database. The invention can also process rectangular arrays, insofar as it is always possible to deduce a square array from a rectangular array (objects×attributes) by computing measurements of similarities between the objects of the original array.

The invention may be used in the field of automatic classification (better known by the term "clustering"). It finds its application notably in the case where the data to be clustered take the form of relational matrices (relations between the objects to be clustered) and which, in fact, allow very flexible representation of graphs or interdependency networks.

BACKGROUND OF THE INVENTION

In the field of automatic data classification, the problems to be solved consist, starting from a database containing significant quantities of data, of the order of a few hundred thousand or a few million, relating to n objects or individuals $O_i$, in sorting these data very rapidly. These data generally take the form of arrays (or matrices) of two types: rectangular matrices (objects×attributes measured on these objects) or else square matrices (objects×objects), representing relations between the objects. The aim of the clustering consists in constructing, on the basis of these matrices, groups of coherent objects having strong descriptive (description of the individuals) and/or behavioral similarities.

When the data take the form of square matrices, they represent, more often than not, measurements of resemblances or proximities between the objects of the database. The aim thereafter is to seek to discover an optimal and automatic decomposition of the population into a much more restricted number of classes (or clusters) of objects (similar or having the same behaviors) and thereafter to define strategies of actions, depending on the concerned field. For example, one of the possible actions is to discover faults making it possible to predict other faults in a computer network. Another example is to discover a set of customers of a bank to whom it is possible to propose certain products and who have a high probability of responding positively. Another action is to discover niches of clients of an insurance company for whom it is possible to create specific insurance policies which were not, a priori, evident to define, etc. One of the main difficulties in discovering these classes results from the fact that, despite the progress achieved in the computational power of processors and the storage capacity of current computers, the stored data being ever more voluminous, or occupying ever more memory room, it is very difficult to cluster the objects of a database with reasonable processing times. This is still more true when the available data take the form of square matrices representing relations between objects.

Various automatic classification procedures are known from the prior art. Thus, it is possible to cite the procedure of the k-means, hierarchical clustering or else relational analysis.

Patent application EP 1960916, filed by the Applicant, describes a clustering method where the initial data take the form of tables whose rows are the individuals to be clustered and whose columns are variables measured on these individuals.

Despite the good results offered by these prior art procedures, they exhibit notably the following weaknesses:
1) a problem with fixing the number of classes and referents (centers) to be used to initialize the partition to be found. Indeed, the procedures of k-means type, for example, need to fix in an arbitrary manner and, a priori, the number of classes to be found in the data as well as a few initial individuals considered as the centers of the initial classes;
2) a problem with fixing, arbitrarily and a priori, the cutoff level of the dendrogram for the hierarchical clustering procedures,
3) an impossibility of processing significant volumes of data in a linear manner in reasonable times when the data take the form of relational data.

Thus, the usual clustering procedures do not make it possible, on the one hand, to process data of graph or relational type in a linear manner and, on the other hand, they depend heavily on the fixing of parameters such as the number of classes to be found or the centers (objects chosen from among the population according to random mathematical draws or in an arbitrary manner).

SUMMARY OF THE INVENTION

The method according to the invention is based notably on the theory of relational analysis presenting the advantage of not making arbitrary and a-priori assumptions as regards the expected results of the clustering process.

The system and the method according to the invention propose a new approach using rows of the relational matrices to be processed and make it possible, by virtue of these representations, to process very big volumes of data in fast times while reducing both the necessary memory space and also the computation times.

The invention relates to a method for clustering data or objects $O_i$, $O_j$ taking the form of an array S, each of the elements of said array S corresponding to a value of similarity $s_{ij}$ existing between said objects $O_i$ and $O_j$ said method being implemented within a computer linked with a database containing the data or objects to be clustered comprising a work memory, a processor, characterized in that it comprises at least the following steps:
1) determine a number k of classes of objects in the following manner: take an object $O_i$ which has the fewest possible similarities $s_{ij}$ with the other objects $O_j$ that is to say the one for which the sum of the components $$\sum_{i'=1}^{n} S_{ii'}$$

of its profile is the smallest,
Place the individual $O_i$ in a first class $C_1$,
Consider all the remaining objects different from $O_i$ and take from among them a second object $O_j$, for which the sum of the components of its profile is the smallest out of the remaining objects, if the relationship $l_{jC_1}$ computed between the new object $O_j$ with the previous class $C_1$ consisting of a single individual is negative, then create a new class $C_2$ and place the object $O_j$ in this new class $C_2$, otherwise (i.e. if this relationship is positive) place the object $O_j$ in the class $C_1$, repeat until all the objects $O_j$ belong to a class of index k, on completion of this first step the method has a set of κ classes (not predefined a priori), 2) for each of the κ classes found in step 1), determine the value of the relationships $l_{C_kC_{k'}}$ between a class $C_k$ and the other classes $C_{k'}$ such that k' is different from k, if all the relationships determined $l_{C_kC_{k'}}$ are negative, then do not merge the class $C_k$ with another class, otherwise merge the class considered $C_k$ with the class $C_{k'}$ with which said class considered $C_k$ has the strongest relationship, the highest value $l_{C_kC_{k'}}$ add this value to the criterion $$C(X) = \left(\sum_{k=1}^{\kappa} l_{C_k C_k}\right) + l_{C_k C'_k}$$

until stability of the criterion $$C(X) = \left(\sum_{k=1}^{\kappa} l_{C_k C_k}\right) + l_{C_k C'_k}$$

is obtained, on completion of this step 2), said method has L classes with L≦κ, 3) take each object $O_j$ of each class $C_l$ (1≦L) one by one, determine the value of the relationship $l_{iC_m}$ of this object with each of the classes $C_l$ other than the class of index k into which it was classed in the initial step, if the value of the relationship $l_{iC_m}$ with the class of index m is greater than the value of the relationship $l_{iC_k}$ then transfer the object from its class of index k to the new class of index m, this is continued until all the values of the relationships $l_{iC_k}$ are negative.

The definition of the relationship $l_{ii}'$ between the objects or the individuals $O_i$ and $O_{i'}$ is explained later in the description. On the basis of the definition of the Condorcet criterion C(X) defined by equation (4)

$$C(X) = \sum_{i=1}^{n}\sum_{i'=1}^{n}\left(s_{ii'} - \alpha \times \frac{s_{ii} + s_{i'i'}}{2}\right)x_{ii'} \quad (4)$$

$$= \sum_{i=1}^{n}\sum_{i'=1}^{n}(A_{ii'} - \alpha \times AM_{ii'})x_{ii'}$$

$$= \sum_{i=1}^{n}\sum_{i'=1}^{n} l_{ii'} x_{ii'}$$

It emerges that the relationship $l_{ii}'$ between the two objects $O_i$ and $O_{i'}$ is none other than the cost of the economic function of the criterion, i.e.:

$l_{ii'} = A_{ii'} - \alpha \times AM_{ii'}$

Where $A_{ii'}$ and $AM_{ii'}$ are the agreement (respectively the maximum possible agreement) between the two objects $O_i$ and $O_{i'}$.

The relationships between an object and a class as well as between two classes are defined further on in the description.

The array is for example a square array representative of n×n objects.

According to one mode of implementation, the method is executed for a rectangular array representative of n objects×a attributes and comprises a step of transforming the array n objects×a attributes to the array S containing the values of similarity $s_{ij}$ existing between said objects $O_i$.

The invention also relates to a system making it possible to cluster data taking the form of an array S, each of the elements of said array S corresponding to a value of similarity $s_{ij}$ existing between said objects $O_j$, characterized in that it comprises at least the following elements: a computer linked with a database to be clustered comprising a work memory a processor suitable for executing the steps of the method exhibiting one of the aforementioned characteristics.

The system can comprise a database containing the result of the clustering method according to the invention, executed on the processor.

BRIEF DESCRIPTION OF THE DRAWINGS

Other characteristics and advantages of the present invention will be more apparent on reading a nonlimiting exemplary embodiment while referring to the figures which represent.

DETAILED DESCRIPTION

Figure 1:
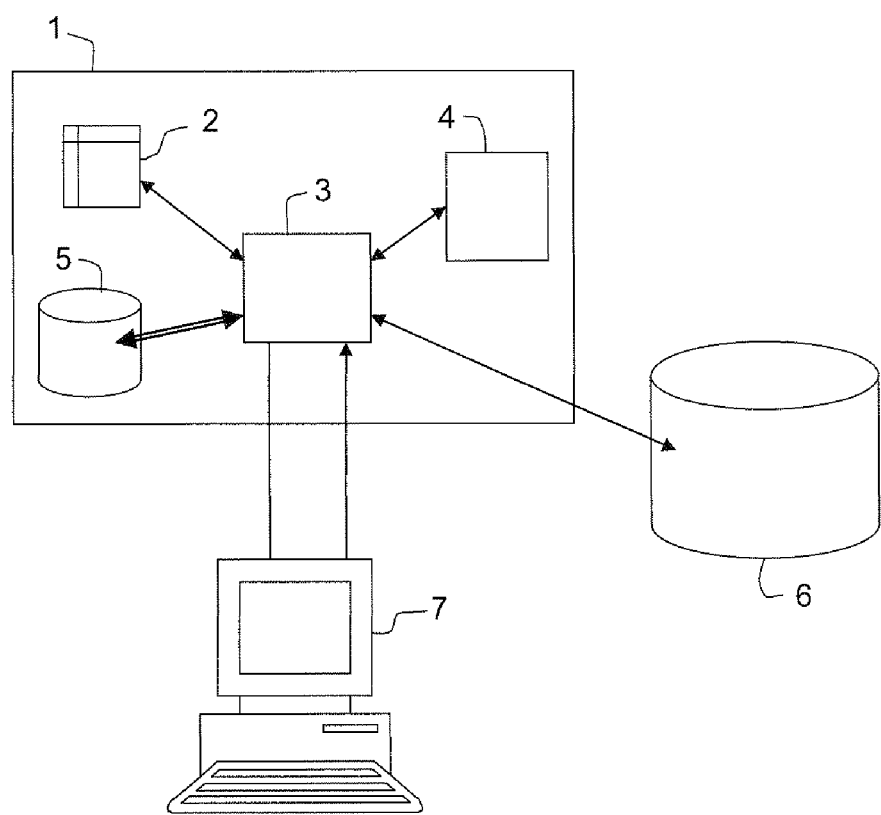
FIG. 1, a diagram corresponding to a platform for processing the data to be clustered comprising a means for executing the method according to the invention, FIG. 2, a functional diagram describing the general operation of the data processing or automatic data classification chain.

FIG. 1 represents an exemplary platform on which the method according to the invention is implemented. This platform comprises, for example, a computer 1 comprising a work memory 2, a processor 3, a buffer memory 4 in the case where the size of the work memory is not sufficient relative to the volume of the processed data. The platform can also contain a database 5 containing the result of the clustering method according to the invention, executed on the processor 3. The computer 1 is linked with a database 6 containing the data to be clustered. The computer also comprises inputs/outputs or man machine interface 7. The man machine interface may be a display screen on which the clustering result will be presented to a user. The arrows represented in FIG. 1 show diagrammatically the various exchanges existing between the processor 3 and the various elements contained in the platform or the elements outside it.

In certain cases of applications, when the data or objects to be clustered do not take the form of a square array of dimension n×n, the method will comprise a preprocessing phase, the function of which is notably to format the objects or data to be clustered into the form of a square array with n dimensions, where n is the number of objects to be clustered, an element $s_{ij}$ of this array corresponding to the similarity value existing between two objects $O_i$, $O_j$ of the array. This similarity value is determined by implementing a method known to the person skilled in the art by the term "similarity computation", which will not be explained in the subsequent description.

In the given example, the method will use the objects of a base in which the relations between objects are stored and will consider that each row of the square array containing a profile of similarity $s_{ij}$ corresponding to a given object $O_i$ with the other objects $O_j$ of the database to be processed. The data processed in the present patent application are data taking the form of squares (Objects×Objects).

The method will thereafter use a binary profile to rapidly compute the relationships $l_{ij}$ between all the pairs of objects $(O_i, O_j)$. By using scalar products between the two profiles of the two objects $(O_i, O_j)$ hereinabove, the method makes it possible to carry out one global scalar product only, so as to compute the similarities between an object and a class instead of carrying out as many scalar products as the number of individuals belonging to the class.

To summarize, the clustering algorithm executed on the processor will take, as input, complex relational data or objects n*n where n is the number of objects to be processed, and process these objects $O_i$ in a linear manner without arbitrary and a-priori fixing of the clustering parameters. The results obtained will be reinserted into a database. If the data do not take a relational form, a preprocessing step consisting in transforming these data into a relational form by computing similarities between objects will be applied upstream. Thus, when the data take a rectangular form, a method for computing measurements of similarity between the objects present will be used to create square matrices, which convey the relations which hold between the objects.

The example which follows is given for a database taking the form of a square array S of dimensions $n^2$ and of general term $s_{ii'}$ representing the value of the aforementioned similarity between two objects $O_i$ and $O_{i'}$, obtained by procedures known to the person skilled in the art, where n is the number of objects to be-clustered.

$$S = \begin{pmatrix} s_{11} & \cdots & s_{1i'} & \cdots & s_{1n} \\ \vdots & \cdots & \vdots & \cdots & \vdots \\ s_{i1} & \cdots & s_{ii'} & \cdots & s_{in} \\ \vdots & \cdots & \vdots & \cdots & \vdots \\ s_{n1} & \cdots & s_{ni'} & \cdots & s_{nn} \end{pmatrix}$$

The objects are numbered from 1 to n, the subscript i of the object $O_i$ is therefore the index number of the object considered.

Each object $O_i$ is represented by two profile vectors $\vec{P}_i^s$ and $\vec{P}_i^b$ of dimension n such that:

$$\vec{P}_i^s = (s_{i1}, s_{i2}, \ldots, s_{ii'}, \ldots, s_{in})$$

$$\vec{P}_i^b = (0, 0, \ldots, 1, \ldots, 0)$$

The profile vector $\vec{P}_i^s$ represents the similarities of the object $O_i$ with the n other objects of the population studied, including itself, and $\vec{P}_i^b$ is a binary vector containing only a single nonzero value equal to 1 in position i of this vector (index number of $O_i$).

The criterion to be maximized to obtain the final partition or classification of a set of objects is the modified Condorcet criterion C(X) defined by:

$$C(X) = \sum_{i=1}^{n} \sum_{i'=1}^{n} (s_{ii'} - \alpha \times f(s_{ii}, s_{i'i'})) x_{ii'}$$

-continued $$= \sum_{i=1}^{n} \sum_{i'=1}^{n} (A_{ii'} - \alpha \times AM_{ii'}) x_{ii'}$$

$$= \sum_{i=1}^{n} \sum_{i'=1}^{n} l_{ii'} x_{ii'}$$

Where:
$f(s_{ii}, s_{i'i'})$ is a function of the inherent similarities $(s_{ii}, s_{i'i'})$ between the two objects $O_i$ and $O_{i'}$, for example:

$$f(s_{ii}, s_{i'i'}) = \frac{s_{ii} + s_{i'i'}}{2}$$

for an arithmetic mean or else $f(s_{ii}, s_{i'i'}) = \sqrt{s_{ii} s_{i'i'}}$ for a geometric mean, etc.

α is a similarity threshold which can either be computed automatically by a function taking into account the similarities between the objects of the database or be defined by the user. A possible function, giving an automatic threshold is, for example, $$\alpha = \frac{\sum_{i=1}^{n} \sum_{i'=1}^{n} s_{ii'}}{\sum_{i=1}^{n} \sum_{i'=1}^{n} f(s_{ii}, s_{i'i'})}$$

$A_{ii'}$ represents the agreement (or similarity) between the objects $O_i$ and $O_{i'}$, $AM_{ii'}$ represents the maximum possible agreement between the objects $O_i$ and $O_{i'}$, $l_{ii'}$ represents the relationship between the objects $O_i$ and $O_{i'}$, (it also represents the cost of the economic function to be maximized), and $x_{ii'}$ is the general term of the square binary matrix X of dimensions $n^2$ representing the final partition to be found, and defined by:

$$x_{ii'} = \begin{cases} 1 & \text{if } O_i \text{ and } O_{i'} \text{ are in the same class of the final partition} \\ 0 & \text{in the converse case} \end{cases}$$

Denoting by (●) the scalar product between two arbitrary vectors and by using the profile vectors $\vec{P}_i^s$ and $\vec{P}_i^b$ we obtain:

$$A_{ii'} = \vec{P}_i^b \cdot \vec{P}_{i'}^s = \vec{P}_i^s \cdot \vec{P}_{i'}^b = \frac{\vec{P}_i^b \cdot \vec{P}_{i'}^s + \vec{P}_i^s \cdot \vec{P}_{i'}^b}{2} \quad (1)$$

$$AM_{ii'} = \frac{\vec{P}_i^b \cdot \vec{P}_i^s + \vec{P}_{i'}^b \cdot \vec{P}_{i'}^s}{2} \quad (2)$$

$$l_{ii'} = \frac{\vec{P}_i^b \cdot (\vec{P}_{i'}^s - \alpha \vec{P}_i^s) + \vec{P}_{i'}^b \cdot (\vec{P}_i^s - \alpha \vec{P}_{i'}^s)}{2} \quad (3)$$

These computations being carried out for all the pairs of objects of the base to be clustered, the algorithm is still of complexity $O(n^2)$ at this juncture.

The criterion to be maximized to obtain the final partition or classification of a set of classes is the modified Condorcet criterion C(X) defined by:

$$C(X) = \sum_{i=1}^{n}\sum_{i'=1}^{n}\left(s_{ii'} - \alpha \times \frac{s_{ii'} + s_{i'i'}}{2}\right)x_{ii'} \quad (4)$$

$$= \sum_{i=1}^{n}\sum_{i'=1}^{n}(A_{ii'} - \alpha \times AM_{ii'})x_{ii'}$$

$$= \sum_{i=1}^{n}\sum_{i'=1}^{n}l_{ii'}x_{ii'}$$

To pass to the linearization method, it is necessary to compute the terms corresponding to formulae (1), (2), (3) hereinabove between an object $O_i$ and a class C and between two classes C and C'.

By using formula (1), it is possible to compute the agreements between an object $O_i$ and a class C and the agreements between two classes C and C' denoted respectively $A_{iC}$ and $A_{CC'}$ by using the following two formulae $$A_{iC} = \sum_{i' \in C} \vec{P}_i^b \cdot \vec{P}_{i'}^s = \sum_{i' \in C} \vec{P}_i^s \cdot \vec{P}_{i'}^b = \vec{P}_i^b \cdot \vec{P}_C^s = \vec{P}_i^s \cdot \vec{P}_C^b = \frac{\vec{P}_i^b \cdot \vec{P}_C^s + \vec{P}_i^s \cdot \vec{P}_C^b}{2} \quad (5)$$

$$A_{CC'} = \vec{P}_C^b \cdot \vec{P}_{C'}^s = \vec{P}_C^s \cdot \vec{P}_{C'}^b = \frac{\vec{P}_C^b \cdot \vec{P}_{C'}^s + \vec{P}_C^s \cdot \vec{P}_{C'}^b}{2} \quad (6)$$

where $\vec{P}_C^b$ is a binary vector of dimension n such that all the components are equal to 0 except those corresponding to the individuals of the class C and $\vec{P}_C^s$ is a vector of dimension n such that each component contains the sum of the similarities between each and all the other objects of the class C:

$$\vec{P}_C^b = \sum_{i \in C} \vec{P}_i^b$$

$$\vec{P}_C^s = \sum_{i \in C} \vec{P}_i^s$$

Likewise, by using formula (2), it is possible to compute the maximum possible agreements between, on the one hand, an object $O_i$ and a class C denoted $AM_{iC}$ and, on the other hand, between two classes C and C' denoted $AM_{CC'}$, by the relations:

$$AM_{iC} = \sum_{i' \in C} AM_{ii'} = \frac{|C|(\vec{P}_i^b \cdot \vec{P}_i^s) + |\vec{P}_C|}{2} \quad (6)$$

$$AM_{CC'} = \frac{|C| \times |\vec{P}_{C'}| + |C'| \times |\vec{P}_C|}{2} \quad (7)$$

where:

$$|\vec{P}_C| = \sum_{i \in C}(\vec{P}_i^b \cdot \vec{P}_i^s)$$

finally, the relationships $l_{iC}$ and $l_{CC'}$ between respectively an object $O_i$ and a class C and between two classes C and C' are defined by the relations:

$$l_{iC} = A_{iC} - \alpha \times AM_{iC}$$

$$l_{CC'} = A_{CC'} - \alpha \times AM_{CC'}$$

If $\vec{P}_G^b$ denotes the binary vector of dimension n all of whose components are equal to 1 and $|\vec{P}_G|$ denotes the trace of the matrix of similarities. Stated otherwise, the sum of the inherent similarities of all the objects of the population or of all the objects $O_i$ of the database:

$$|\vec{P}_G| = \sum_{i=1}^{n} A_{ii}$$

then the quality $Q_C$ of a class C will be given by the relation:

$$Q_C = \frac{3\vec{P}_C^b \cdot \vec{P}_C^s - 2\vec{P}_C^s \cdot \vec{P}_G^b + (n - 2|C|)|\vec{P}_C| + |C| \times |\vec{P}_G|}{|C| \times |\vec{P}_G| + (n - |C|)|\vec{P}_C|}$$

The letters C, C', have been used to express in a generic manner the principle of the method implemented by the invention; for the example which follows, the Applicant has used indices, moreover, to differentiate the classes.

Figure 2:
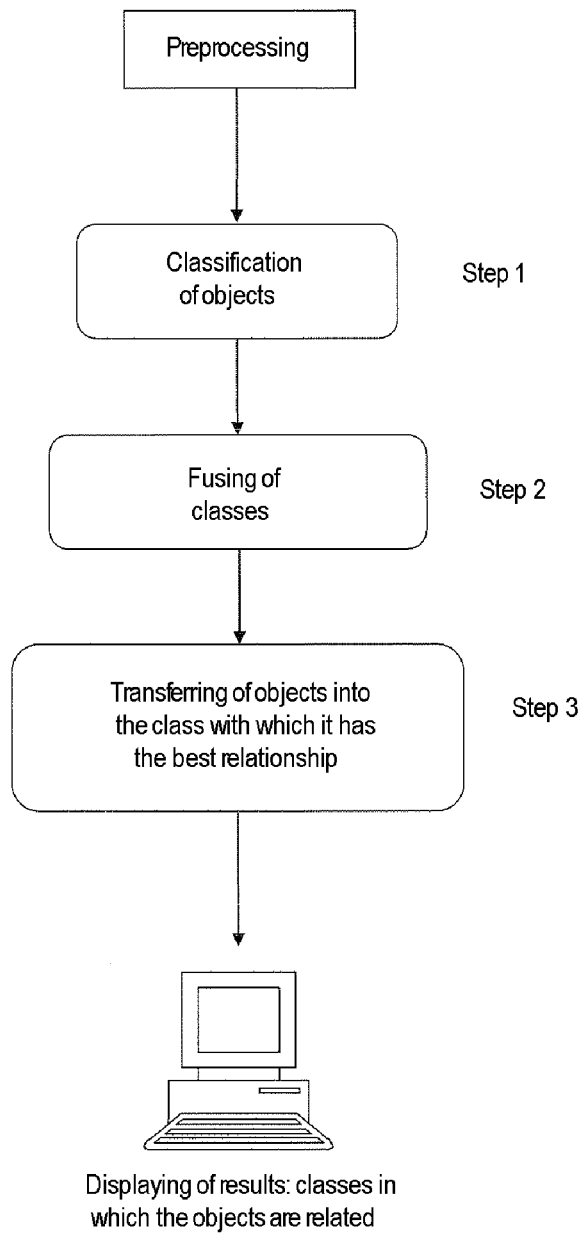

The definitions and the formulations having been set out, the method implemented by the processor of the platform implements the following steps, for which steps a schematic is illustrated in FIG. 2.

Step 1 (Initialization):

Initialization consists in starting from the objects $O_i$ contained in the database to be clustered, and in forming the classes as we proceed. Of course, for this step, the data are already in the form of a square array T as illustrated previously which has general term $s_{ii'}$ representing the value taken by the similarity existing between two objects $O_i$ and $O_{i'}$.

The first step consists in taking an object $O_i$ of the base which has the fewest possible similarities with the other objects, that is to say the one for which the sum of the components of its profile $\vec{P}_i^s$ is the smallest. Stated otherwise, the object $O_i$ for which $$\sum_{i'=1}^{n} s_{ii'}$$

is the smallest is chosen.

This choice makes it possible to identify the most atypical classes of objects (those which contain the objects which have the fewest similarities with the majority of the objects). It also makes it possible to avoid having very big classes, which as the iterations proceed become noisy.

Thereafter the object $O_i$ found is placed in a first class $C_1$ where it will be the only element.

Thereafter, from among the remaining objects, the object $O_j$, the sum of the elements of whose profile $\vec{P}_j^s$ is the smallest, is chosen. Thereafter the relationship $l_{jC_1}$ between the new object $O_j$ and the class $C_1$ is computed. If the relationship $l_{jC_1}$ is strictly positive ($l_{jC_1} > 0$), then the object $O_j$ is placed in class $C_1$, otherwise a new class $C_2$ is created, in which the new object $O_j$ is placed.

Take, thereafter, a third object $O_{i''}$, the one with the smallest sum of the elements of the profile $\vec{P}_{i''}^s$ out of those which remain, compute its relationship $l_{i''C_1}$, $l_{i''C_2}$ with the two existing classes $C_1$ and $C_2$. If the two relationships $l_{i''C_1}$, $l_{i''C_2}$ are negative, create a new class $C_3$ and place the object $O_{i''}$ in it, otherwise place the object in the class $C_1$ or $C_2$ with which it has the greatest relationship, i.e. the highest value of the relationship.

Continue this method, until all the objects are assigned to a class $C_k$.

On completion of this first step, the method has a set of κ classes containing objects which are inter-connected by the strongest positive relationships.

In this step the Condorcet criterion (formula 4) may be reformulated as a function of the κ classes in the form:

$$C(X) = \sum_{k=1}^{\kappa} l_{C_k C_k} \quad (8)$$

Indeed, at this juncture, only the relationships of the individuals belonging to one and the same class will be taken into account in the value of the criterion.

Step 2 (Merging of Two Classes):

Thereafter, take the κ classes $C_1$, $C_2$, one after another, compute for each class considered $C_k$ its relationships $l_{C_k C_{k'}}$ existing with the other classes $C_{k'}$ ($k' \neq k$). If all the relationships of $C_k$ with the other classes are negative this class is left as is and another class is chosen, otherwise the class considered $C_k$ is merged with the class $C_{k'}$ with which it has the strongest relationship, the highest value $l_{C_k C_{k'}}$. For this purpose, the method will determine the value of the relationship $l_{C_k C_{k'}}$ between the class $C_k$ and a class $C_{k'}$ where ($k'=1, 2, \ldots, \kappa$) and ($k' \neq k$); this merging will increase the value of the Condorcet criterion by increasing it by the value of the relationship $l_{C_k C_{k'}}$. Stated otherwise, returning to formula (8) of the criterion, we will have:

$$C(X) = \left( \sum_{k=1}^{\kappa} l_{C_k C_k} \right) + l_{C_k C_{k'}} \quad (9)$$

the method will therefore determine the largest value of the relationship $l_{C_k C_{k'}}$ found and add it to the criterion $C(X)$. This must be carried out for as long as there is a possibility of improving the criterion. The method computes the relationships as long as there exists a relationship having a positive value. It stops when all the relationships are negative. On completion of this second step, the method has a set of L classes where $L \leq \kappa$, (number of classes less than or equal to the value κ of initial classes).

Step 3 (Transfer):

The transfer step consists in transferring, when this operation helps to improve the Condorcet criterion, an object $O_i$ situated in one of the L previously defined classes, from its own class $C_k$ to another class $C_m$ with which it has a better relationship, that is to say, the class such that the value $l_{iC_m}$ is the largest.

Indeed, when no merging between classes is possible any longer, that is to say when all the relationships computed in step 2 are negative, the method considers all the objects $O_i$ of each class $C_l$ one by one, with l less than or equal to L, the method determines the value of the relationship of each object $O_i$ with each of the classes $C_l$ other than the class of index k into which it was classed in the initial step. If an object $O_i$ has a better relationship with another class than its own then this object will be transferred from its class to the new class of index m, with which it has the best relationship, this corresponding to the highest value $l_{iC_m}$.

This will be continued until there is no longer any possibility of improving the criterion, that is to say when all the values of the relationships $l_{iC_k}$ are negative.

When no transfer of the objects from one class to another is possible any longer, we return to step 2, to see whether it is not possible to improve the Condorcet criterion by merging other classes. The two previous steps will be applied until there can no longer be any improvement in the value of the Condorcet criterion.

This invention finds its application in various fields as varied as on-line marketing, for example, or strategic monitoring (co-filings of patents, co-citations, co-publications, shared inventions, collaborations, etc.).

For on-line marketing, it is possible to contemplate the monitoring of blogs on the Internet. For this purpose a number N of blogs will be studied and a preprocessing prior to the implementation of the method will make it possible to identify, on each of the blogs, the other blogs referenced. On completion of this preprocessing an N×N matrix identifying the blogs which are related will be generated. This matrix corresponds to the aforementioned square array. Clustering these blogs by implementing the method according to the invention will amount, therefore, to identifying the groups of blogs which are the most related to one another. Statistical computations will thereafter be carried out inside each group to identify the most dynamic blog in each group. It will then suffice to propose a given product to this blog, so that it undertakes the promotion thereof to the other blogs with which it is related.

For an application to strategic monitoring, it will be possible to watch databases of patents, the press, science, etc. It will be possible, thereafter, to extract from these bases information of the type: who are the co-inventors in the case of patents, what are the co-citations in scientific articles, for example, the collaborations, etc. All this information, once classified (or clustered) by executing the method according to the invention, will be able to make it possible to identify the centers of interest of a group of inventors (or even of a company or country) etc.

This invention uses a novel and original method to cluster large databases, in a fast and linear manner. It takes into account various types of data: either of rectangular type (objects×variables) representing variables measured on the objects of the base, the variables are for example attributes a, or of square type (Objects×Objects) representing measurements of similarities or more generally, relations between the objects of the base.

The invention claimed is:

1. A method for clustering data or objects taking the form of an array S, each of the elements of said array S corresponding to a value of similarity $s_{ij}$ existing between said data or objects, said method being implemented within a computer linked with a database containing the data or objects to be clustered comprising a work memory, and a processor, the method comprising:

1) determining a number k of classes of objects in the following manner:

take one of the data or objects, $O_i$, which has the fewest possible similarities $s_{ij}$ with the other data or objects, for which the sum of the components $$\sum_{i'=1}^{n} s_{ii'}$$

of a profile for $O_i$ is the smallest,

Place the individual $O_i$ in a first class $C_1$,

Consider the remaining data or objects different from $O_i$ and take from among them a second object $O_j$, for which the sum of the components of a profile for $O_j$ is the smallest out of the remaining objects, if a relationship $l_{jC_1}$ computed between the second object $O_j$ with the previous class $C_1$ consisting of a single individual is negative, then create a new class $C_2$ and place the second object $O_j$ in the new class $C_2$, otherwise if this relationship is positive, place the object $O_j$ in the class $C_1$, repeat until all the data or objects $O_j$ belong to a class of index k, on completion of this first step the method has a set of κ classes, 2) for each of the κ classes found in step 1), determine the value of the relationships between a class $C_k$ and the other classes $C_{k'}$ such that k' is different from k, if all the relationships determined $l_{C_k C_{k'}}$ are negative, then do not merge the class $C_k$ with another class, Otherwise, merge the class considered $C_k$ with the class $C_{k'}$ with which $C_k$ has the strongest relationship, the highest value $l_{C_k C_{k'}}$, add this value to the criterion $$C(X) = \left(\sum_{k=1}^{K} l_{C_k C_k}\right) + l_{C_k C_{k'}}$$

until stability of this criterion is obtained, on completion of step 2), the method has L classes with L≦κ, 3) determining, for each object of each class $C_l$ with 1≦L one by one, a value of a relationship $l_{iC_m}$ of the object with each of the classes $C_j$ other than the class of index k into which the object was classed in step, 1) if a value of a relationship $l_{iC_m}$ with the class of index m is greater than the value of the relationship $l_{iC_k}$ then transfer the object from the class of index k to the new class of index m, this is continued until all the values of the relationships $l_{iC_k}$ are negative.

2. The method according to claim 1, wherein a square array representative of n×n objects is used.

3. The method according to claim 1, wherein a rectangular array representative of n objects×a attributes is used, and a step of transforming the array n objects×a attributes to the array S containing the values of similarity $s_{ij}$ existing between said data or objects is executed.

4. A system to cluster data or objects taking the form of an array S, each of the elements of said array S corresponding to a value of similarity $s_{ij}$ existing between said data or objects, the system comprising:

a computer linked with a database to be classified comprising a work memory, a processor configured to perform:

1) determining a number k of classes of objects in the following manner:

take one of the data or objects, $O_i$, which has the fewest possible similarities $s_{ij}$ with the other data or objects, for which the sum of the components $$\sum_{i'=1}^{n} s_{ii'}$$

of a profile for $O_i$ is the smallest,

Place the individual $O_i$, in a first class $C_1$,

Consider the remaining data or objects different from $O_i$, and take from among them a second object $O_j$, for which the sum of the components of a profile for $O_j$, is the smallest out of the remaining objects, if a relationship $l_{jC_1}$ computed between the second object $O_j$ with the previous class $C_1$ consisting of a single individual is negative, then create a new class $C_2$ and place the second object $O_j$ in the new class $C_2$, otherwise if this relationship is positive, place the object $O_j$ in the class $C_1$, repeat until all the data or objects $O_j$ belong to a class of index k, on completion of this first step the method has a set of κ classes, 2) for each of the κ classes found in step 1), determine the value of the relationships between a class $C_k$ and the other classes $C_{k'}$, such that k' is different from k, if all the relationships determined $l_{C_k C_{k'}}$ are negative, then do not merge the class $C_k$ with another class, Otherwise, merge the class considered $C_k$ with the class $C_{k'}$, with which $C_k$ has the strongest relationship, the highest value $l_{C_k C_{k'}}$, add this value to the criterion $$C(X) = \left(\sum_{k=1}^{K} l_{C_k C_k}\right) + l_{C_k C_{k'}}$$

until stability of this criterion is obtained, on completion of step 2), the method has L classes with L<κ, 3) determining, for each object of each class $C_l$ with 1<L, one by one, a value of a relationship $l_{iC_m}$ of the object with each of the classes $C_j$, other than the class of index k into which the object was classed in step 1), if a value of a relationship $l_{iC_m}$ with the class of index m is greater than the value of the relationship $l_{iC_k}$ then transfer the object from the class of index k to the new class of index m, this is continued until all the values of the relationships $l_{iC_k}$ are negative.

5. The system according to claim 4, further comprising: a database containing the result of the classification.

6. The system according to claim 4, further comprising: inputs/outputs or a man machine interface.

* * * * *